(12) United States Patent
Chun et al.

(10) Patent No.: US 9,264,918 B2
(45) Date of Patent: Feb. 16, 2016

(54) RESOURCE ALLOCATION METHOD AND DEVICE IN MULTI-NODE SYSTEM

(75) Inventors: Jin Young Chun, Gyeonggi-do (KR); Ki Tae Kim, Gyeonggi-do (KR); Su Nam Kim, Gyeonggi-do (KR); Ji Won Kang, Gyeonggi-do (KR); Bin Chul Ihm, Gyeonggi-do (KR); Sung Ho Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 13/992,693

(22) PCT Filed: Dec. 2, 2011

(86) PCT No.: PCT/KR2011/009303
§ 371 (c)(1),
(2), (4) Date: Jun. 7, 2013

(87) PCT Pub. No.: WO2012/077938
PCT Pub. Date: Jun. 14, 2012

(65) Prior Publication Data
US 2013/0250821 A1  Sep. 26, 2013

Related U.S. Application Data

(60) Provisional application No. 61/421,633, filed on Dec. 10, 2010.

(51) Int. Cl.
| | |
|---|---|
| *H04W 24/10* | (2009.01) |
| *H04W 72/04* | (2009.01) |
| *H04W 84/04* | (2009.01) |
| *H04J 11/00* | (2006.01) |
| *H04B 7/02* | (2006.01) |
| *H04W 24/02* | (2009.01) |

(52) U.S. Cl.
CPC ........... *H04W 24/02* (2013.01); *H04J 11/0079* (2013.01); *H04W 72/0406* (2013.01); *H04B 7/022* (2013.01); *H04W 24/10* (2013.01); *H04W 72/0426* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2008/0025254 A1* | 1/2008 | Love et al. | 370/329 |
| 2008/0137562 A1* | 6/2008 | Li et al. | 370/280 |
| 2008/0316969 A1* | 12/2008 | Prakash et al. | 370/331 |
| 2009/0221284 A1* | 9/2009 | Kim et al. | 455/426.1 |
| 2010/0309876 A1* | 12/2010 | Khandekar et al. | 370/330 |

(Continued)

FOREIGN PATENT DOCUMENTS

| | | |
|---|---|---|
| KR | 10-2004-0007434 A | 1/2004 |
| KR | 10-2007-0118264 A | 12/2007 |
| KR | 10-2010-0102564 A | 9/2010 |

(Continued)

*Primary Examiner* — Noel Beharry
*Assistant Examiner* — Aung Oo
(74) *Attorney, Agent, or Firm* — Dentons US LLP

(57) ABSTRACT

Provided are a resource allocation method and device in a multi-node system comprising a plurality of nodes and a base station which is connected to each of the plurality of nodes and controls same. The method comprises: partitioning wireless resources which the base station can use; and allocating the partitioned wireless resources to the plurality of nodes, respectively, wherein the wireless resources allocated to the plurality of nodes, respectively, have different frequency bands or frame structures between the nodes which may cause interference.

10 Claims, 9 Drawing Sheets

(56) References Cited

U.S. PATENT DOCUMENTS

2011/0003553 A1* 1/2011 Kim et al. .................. 455/63.1
2012/0039290 A1* 2/2012 Vrzic et al. ................. 370/329

FOREIGN PATENT DOCUMENTS

KR 10-2010-0112135 A 10/2010
WO WO 2009079650 A2 * 6/2009

* cited by examiner

RESOURCE ALLOCATION METHOD AND DEVICE IN MULTI-NODE SYSTEM

This Application is a 35 U.S.C. §371 National Stage Entry of International Application No. PCT/KR2011/009303, filed Dec. 2, 2011, and claims the benefit of U.S. Provisional Application No. 61/421,633, filed Dec. 10, 2010, all of which are incorporated by reference in their entirety herein.

TECHNICAL FIELD

The present invention relates to wireless communication and, more particularly, to a method and apparatus for allocating radio resources in a multi-node system.

BACKGROUND ART

Recently, the data transfer rate over a wireless communication network is rapidly increasing. This results from the appearance and spread of a variety of devices, such as smart phones and tablet PCs which require Machine-to-Machine (M2M) communication and a high data transfer rate. Carrier Aggregation (CA) technology in which more frequency bands are efficiently used in order to meet a higher data transfer rate, Cognitive Radio (CR) technology, multiple antenna technology in which a data capacity is increased within a limited frequency, multiple base station cooperation technology, etc. are recently highlighted.

Furthermore, a wireless communication network is evolving into an increase in the density of accessible nodes around a user. Here, the nodes mean antennas or a group of antennas which are spaced apart from one another at specific intervals. However, the node is not limited to this sense, but can be used as a broader sense. That is, the node can become a pico eNB (PeNB), a home eNB (HeNB), a Remote Radio Head (RRH), a Remote Radio Unit (RRU), a relay, or distributed antennas (or group). A wireless communication system including nodes having a high density can have higher system performance through cooperation between the nodes. That is, if the transmission and reception of nodes are managed by one control station and thus the nodes operates like antennas or a group of antennas for one cell, the nodes can have more excellent system performance as compared with a case where the nodes operate as independent base stations. A wireless communication system including a plurality of nodes is hereinafter referred to as a multi-node system. If each node forming a multi-node system is an antenna, this is called a Distributed Antenna System (DAS).

In a multi-node system, each node may use its own cell identifier (ID) different from an eNB or may use the same cell ID as an eNB. If each node has its own cell ID and performs scheduling and handover, this multi-node system can be considered as a multi-cell system. In a multi-cell system, if cells (i.e., the coverages of nodes) are overlaid with each other, this multi-cell system is referred to as a multi-tier network.

In an existing wireless communication system, antennas are concentrically deployed in a base station that provides service to a specific geographical area. This wireless communication system is a called a Centralized Antenna System (CAS). If a multi-node system is introduced in such a way as to add nodes to an existing wireless communication system, how resources will be allocated to each node according to what method is problematic.

DISCLOSURE

Technical Problem

A method and apparatus for allocating radio resources in a multi-node system are sought to be provided.

Technical Solution

A method of allocating resources in a multi-node system including a plurality of nodes and a Base Station (BS) connected to the plurality of nodes and capable of controlling the plurality of nodes in accordance with an aspect of the present invention includes partitioning radio resources available for the BS and allocating the partitioned radio resources to the plurality of nodes, wherein the radio resources allocated to the plurality of nodes have different frequency bands or frame structures between nodes capable of generating mutual interference.

If the plurality of nodes is N in number, the radio resources available for the BS may be partitioned into N frequency bands in a frequency domain, and any one of the partitioned N frequency bands may be allocated to each of the plurality of nodes. Here, N is a natural number equal to or greater than 2.

If the plurality of nodes is N in number and the N nodes are partitioned into node groups formed of M nodes, the radio resources available for the BS may be partitioned into M frequency bands in a frequency domain, and each one of the partitioned M frequency bands may be allocated to M nodes included in the same node group. Here, each of N and M is a natural number equal to or greater than 2, and N is greater than M.

The BS may send node resource allocation information to terminals, and the node resource allocation information may include information indicative of radio resources allocated to each of the plurality of nodes.

If the BS and the plurality of nodes operate in Time Division Duplex (TDD), a ratio of downlink subframes and uplink subframes may be differently set in a frame used by each of the plurality of nodes.

If the BS and the plurality of nodes support a multi-carrier operation, carriers allocated as downlink carriers and carriers allocated as uplink carriers, from among a plurality of carriers allocated to the plurality of nodes, may be differently allocated.

An apparatus for allocating resources in a multi-node system including the apparatus connected to a plurality of nodes and capable of controlling the plurality of nodes in accordance with an aspect of the present invention includes a Radio Frequency (RF) unit transmitting and receiving radio signals and a processor connected to the RF unit and generating the radio signals, wherein the processor partitions available radio resources and allocates the partitioned radio resources to the plurality of nodes, and the radio resources allocated to the plurality of nodes have different frequency bands or frame structures between nodes capable of generating mutual interference.

If the plurality of nodes is N in number, the processor may partition the available radio resources into N frequency bands in a frequency domain and allocate each one of the partitioned N frequency bands to each of the plurality of nodes. Here, N is a natural number equal to or greater than 2.

If the plurality of nodes is N in number and the N nodes are partitioned into node groups formed of M nodes, the processor may partition the available radio resources into M frequency bands in a frequency domain and allocate any one of the partitioned M frequency bands to M nodes included in an identical node group. Here, each of N and M is a natural number equal to or greater than 2, and N is greater than M.

The processor may send node resource allocation information to terminals, and the node resource allocation information may include information indicative of radio resources allocated to each of the plurality of nodes.

If the apparatus and the plurality of nodes operate in Time Division Duplex (TDD), the processor may differently allocate a ratio of downlink subframes and uplink subframes in a frame allocated to each of the plurality of nodes.

If the apparatus and the plurality of nodes support a multi-carrier operation, the processor may differently allocate carriers allocated as downlink carriers and carriers allocated as uplink carriers, from among a plurality of carriers allocated to the plurality of nodes.

Advantageous Effects

In a multi-node system, interference can be reduced by allocating different resources to nodes, and thus system efficiency can be improved.

MODE FOR INVENTION

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3$^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (A) is a subsequent system of LTE. IEEE 802.16m is a subsequent system of IEEE 802.16e.

Figure 1:
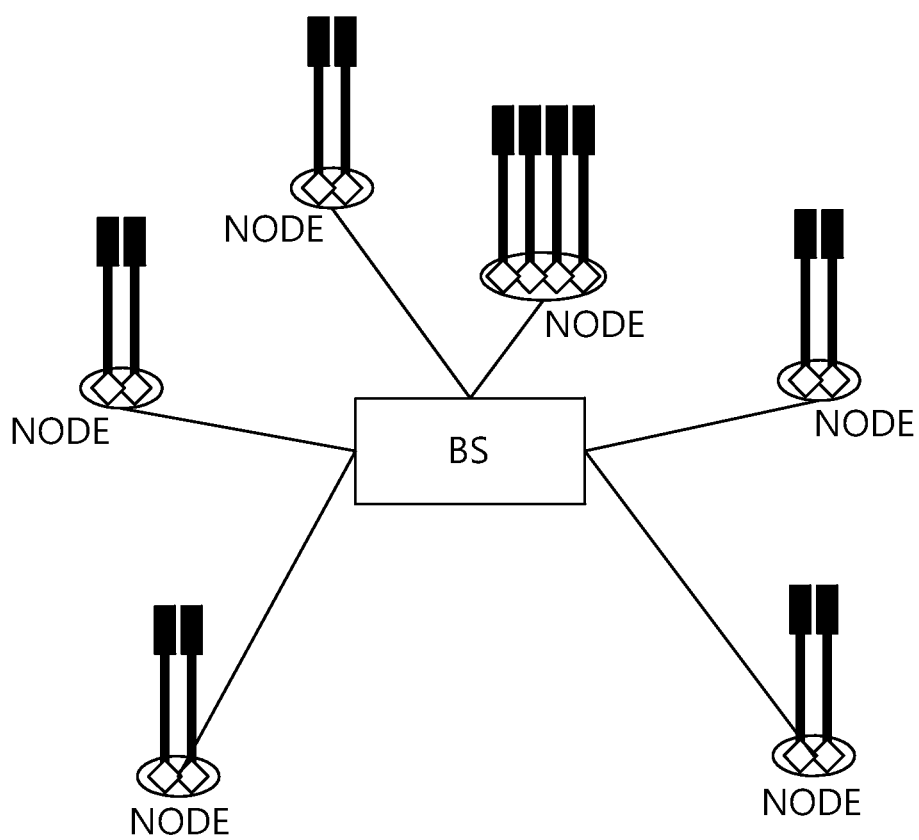
FIG. 1 shows an example of a multi-node system.

FIG. 1 shows an example of a multi-node system.

The multi-node system includes a Base Station (BS) and a plurality of nodes.

The BS provides communication service to a specific geographical area. The BS commonly refers to a fixed station that communicates with terminals, and the BS may also be called another term, such as an evolved-NodeB (eNB), a Base Transceiver System (BTS), or an Advanced Base Station (ABS).

FIG. 1 illustrates distributed antennas as an example of nodes. In this sense, the node can be called an Antenna Node (AN). However, the node is not limited to a distributed antenna, but can be implemented as, for example, a BS, a picocell eNB (PeNB), a home eNB (HeNB), a Remote Radio Head (RRH), or a relay, etc. The node is also called a point. The nodes can be connected to a BS in a wired or wirelessly way and can be controlled/managed by the BS.

From a viewpoint of a terminal, a node can be identified or indicated through a Reference Signal (RS) or a pilot signal. The RS (or pilot signal) is a signal known to a transmission terminal and a reception terminal, and the RS means a signal used in channel measurement, data demodulation, etc. An RS includes, for example, a Channel Status Indication-Reference Signal (CSI-RS) regulated in 3GPP LTE-A, a preamble regulated in IEEE 802.16m, a midamble, etc. This RS and a configuration for the RS can be mapped to each node. Thus, a terminal can identify a node or the terminal can be informed of the node based on a CSI-RS configuration, and the terminal can obtain channel status information about the corresponding node. The RS configuration can include information about a configuration index, the number of antenna ports of each node, Resource Elements (REs) being used, a transmission cycle, an offset of a transmission time point, etc.

Referring to back to FIG. 1, the antenna nodes are connected to the BS in a wired/wireless way. Each of the antenna nodes can include one antenna or an antenna group (i.e., a plurality of antennas). Antennas belonging to one antenna node are placed within several meters geographically, and they can have the same characteristic. In a multi-antenna node system, an antenna node functions as an Access Point (AP) accessible to a terminal.

If nodes are formed of antennas as described above, this multi-node system is also called a Distributed Antenna System (DAS). That is, a DAS refers to a system in which antennas (i.e., nodes) are distributed and deployed at various positions geographically and the antennas are managed by an eNB. A DAS differs from a conventional Centralized Antenna System (CAS) in that the antennas of an eNB are localized and placed at the center of a cell.

Here, the meaning that antennas are distributed and deployed geographically can mean that one receiver and a plurality of antennas are deployed so that a difference in the channel status between each of the antennas and the receiver is a specific value or higher when the one receiver receives the same signal from the plurality of antennas. The meaning that antennas are localized and deployed can mean that the antennas are densely deployed so that a difference in the channel status between each of the antennas and one receiver is less than a specific value. The specific value can be determined in various ways depending on a frequency and the type of service used in antennas.

Figure 2:
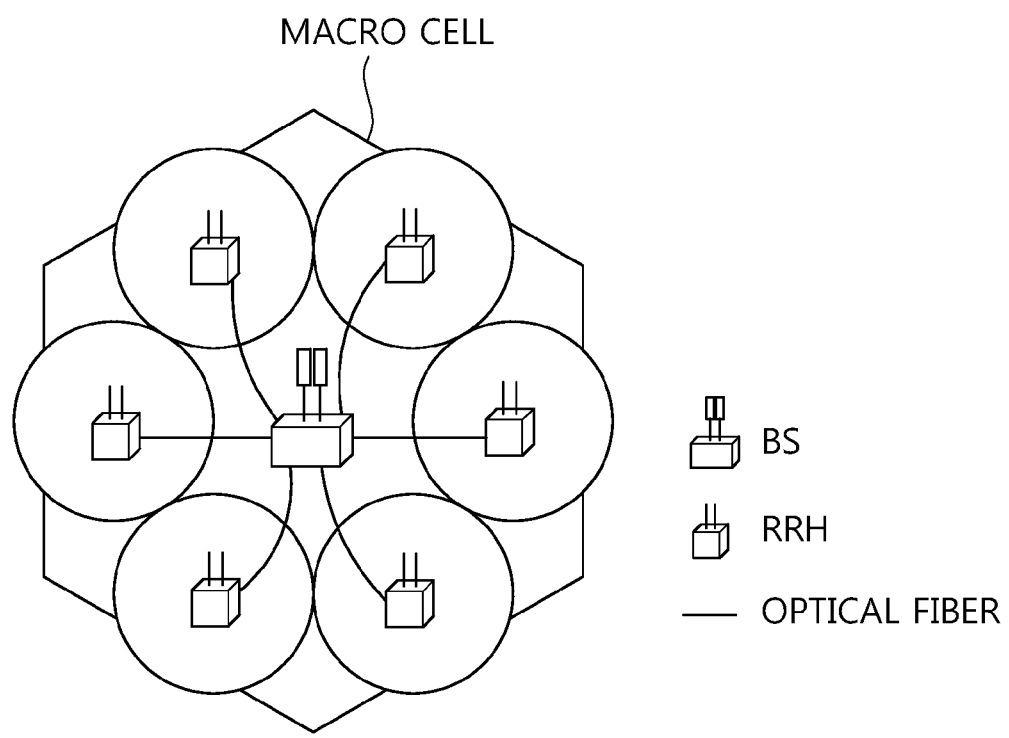
FIG. 2 shows an example of the disposition of nodes in a multi-node system.

FIG. 2 shows an example of the disposition of nodes in a multi-node system.

Referring to FIG. 2, the multi-node system can have a form in which a plurality of nodes is deployed within a macro cell where a BS provides service. That is, the multi-node system can have a heterogeneous network form in which a plurality of nodes having low transmission power is included within the coverage of a macro cell having high transmission power. Here, each node can have a different cell ID from a macro cell (i.e., BS) or can have the same cell ID as the macro cell. The present invention can be applied to both the cases. The cell ID can be used as a seed number when a synchronization signal, an RS or the like is transmitted, and a terminal can identify the cell ID of the node through the synchronization signal, the RS, etc.

Furthermore, the present invention can be applied to a multi-node system supporting multiple carriers. If a multi-carrier operation is supported, two types of carriers are defined from a viewpoint of a terminal. A primary carrier means an independent carrier by which a terminal can complete an initial network entry or network re-entry process. Furthermore, mobility, an MAC state, and the context of a terminal are controlled and managed through the primary carrier. All MAC control messages unicasted in relation to a multi-carrier operation are transmitted through the primary carrier. If a multi-carrier operation is supported, a terminal can have only one primary carrier and have a plurality of secondary carriers. The secondary carrier means an additional carrier allocated to the terminal by a BS.

A physical carrier index is allocated in order to indicate carriers available in the entire network and is indexed from a low frequency to a high frequency. Each physical carrier can be partitioned into a fully configured carrier and a partially configured carrier. The fully configured carrier means a carrier in which all control channels, such as synchronization, broadcast, multicast, and unicast control signaling, are configured. The fully configured carrier is supported by all terminals irrespective of whether a multi-carrier operation is supported or not.

The partially configured carrier means a carrier in which only downlink transmission is configured. The partially configured carrier is not solely used to provide AAI service to a terminal, but can be used along with a primary carrier only.

If a partially configured carrier is used for downlink unicast traffic, necessary uplink feedback channels are provided by a primary carrier. In a multi-carrier operation, uplink control channels corresponding to a secondary partially configured carrier (i.e., secondary carrier used in downlink only) is placed in a control region that is partitioned in the uplink region of a primary carrier and not overlaid with the uplink region. An uplink control region corresponding to a secondary carrier used in downlink only is located subsequently to an uplink control region for a primary carrier. Information about the position of an uplink control channel for a secondary carrier used in downlink only is informed through an AAI_SCD message that is transmitted through the secondary carrier. A terminal uses the uplink control channel of the primary carrier for channel quality measurement and HARQ ACK/NACK feedback that correspond to transmission through the secondary carrier used in downlink only.

A primary carrier can be a fully configured carrier, and a secondary carrier can be a fully configured carrier or a partially configured carrier. Whether a specific carrier is a fully configured carrier or a partially configured carrier is indicated through a PA-preamble transmitted in the specific carrier. If a secondary carrier for one terminal is a fully configured carrier, the fully configured carrier can operate as a primary carrier for other terminals. A plurality of terminals having different primary carriers can share the same physical carrier as their secondary carrier.

A multi-node system supporting multiple carriers supports at least one of a multi-carrier aggregation, multi-carrier switching, and a basic MC mode.

The multi-carrier aggregation is a multi-carrier mode in which a terminal processes data transmission through secondary carrier while maintaining control signaling monitoring and physical layer connection for a primary carrier. The multi-carrier switching means a multi-carrier mode in which a terminal switches physical layer connection from a primary carrier to a secondary carrier in order to receive E-MBS service. After being connected to the secondary carrier for a specific time, the terminal returns back to the primary carrier. The basic MC mode means a multi-carrier mode in which a terminal operates only in one carrier, but supports a primary carrier change process and a process, such as, carrier scanning.

Figure 3:
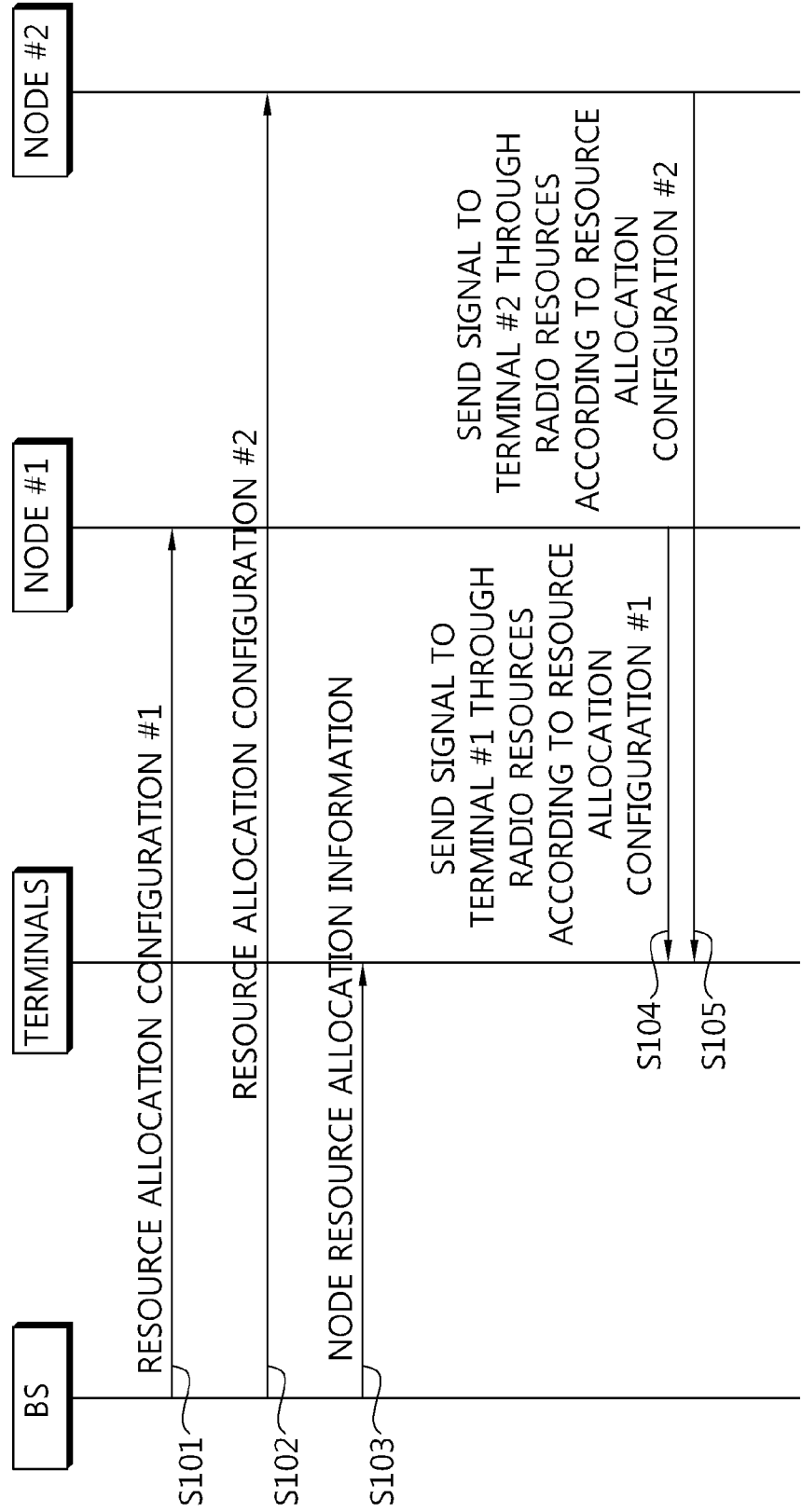
FIG. 3 shows a method of allocating resources in a multi-node system in accordance with an embodiment of the present invention.

FIG. 3 shows a method of allocating resources in a multi-node system in accordance with an embodiment of the present invention.

Referring to FIG. 3, a BS sends resource allocation configurations to a plurality of nodes controlled by the BS. For example, the BS sends a resource allocation configuration #1 to a node #1 (S101) and sends a resource allocation configuration #2 to a node #2 (S102). The BS can inform radio resources, allocated to the nodes, through the resource allocation configurations #1 and 2. The radio resources allocated to each node can be some or all of radio resources available for the BS. A method of allocating resources according to a resource allocation configuration is described in detail later with reference to FIGS. 4 to 8.

The BS sends node resource allocation information to the terminals (S103). The node resource allocation information can include information about the resource allocation configurations #1 and 2 and information indicative of a mapping relationship between the resource allocation configurations #1 and 2 the respective nodes. The node resource allocation information may be broadcast by the BS or may be unicasted by each node. Furthermore, the node resource allocation information can be transmitted through a higher layer signal, such as a Radio Resource Control (RRC) message, or system information. Or, the node resource allocation information may be transmitted through a physical layer channel, such as a physical downlink control channel (PDCCH).

The node #1 sends a signal to a terminal #1 through the radio resources based on the resource allocation configuration #1 (S104), and the node #2 sends a signal to a terminal #2 through the radio resources based on the resource allocation configuration #2 (S105). Here, the terminals #1 and 2 may be different terminals or may be the same terminal.

A method of a BS allocating resources to each node of a multi-node system is described below.

1. Embodiment 1

A method of partitioning and using a resource region between nodes (or node groups)

In this method, if other nodes are added to a center node that controls one cell and the added nodes and the center form a multi-node system, the center node uses resources like in an existing method. In contrast, the added nodes use resources not overlaid with resources used by the center node, but different resources are used between nodes having overlaid coverages.

Figure 4:
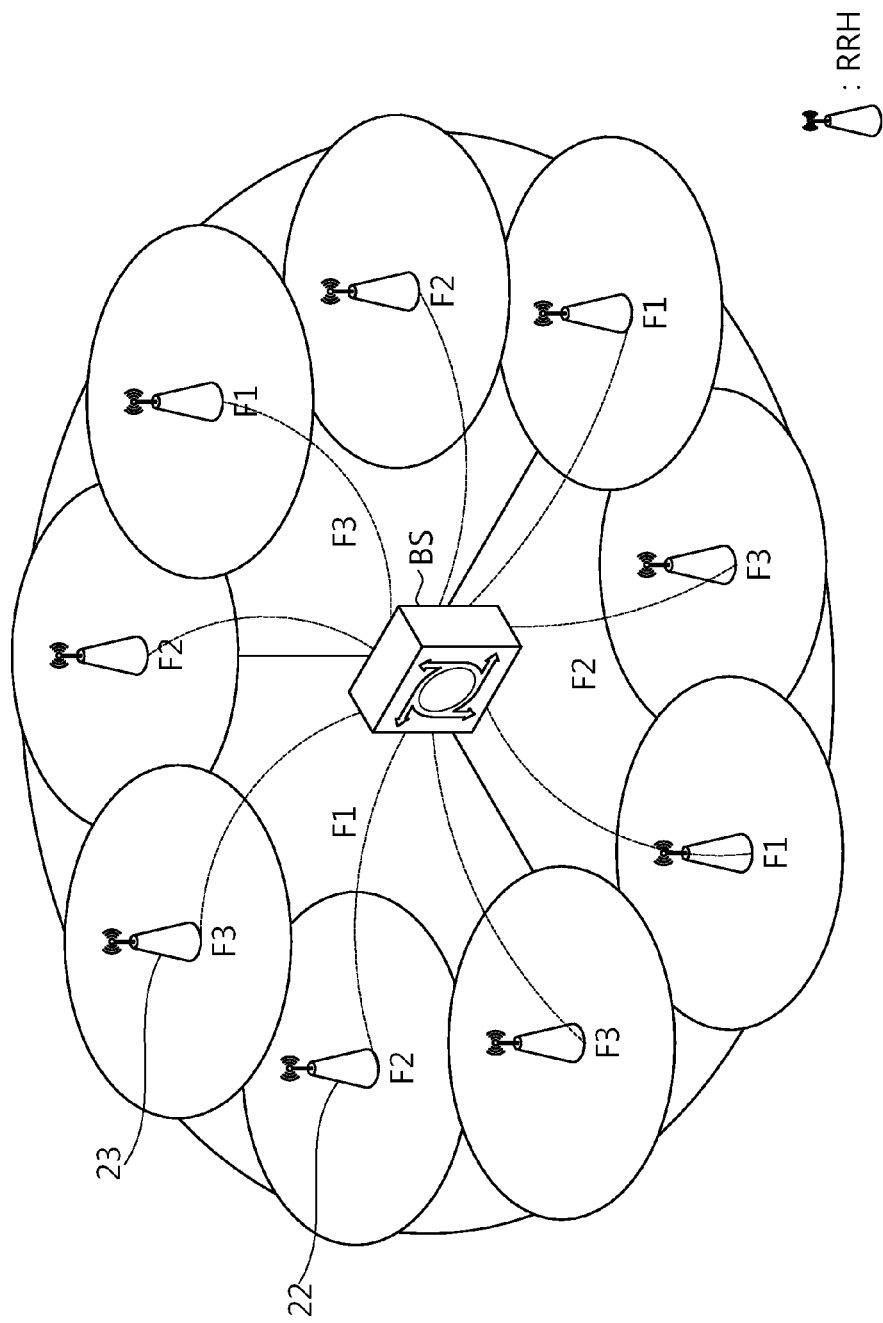
FIG. 4 shows an example in which a resource region is partitioned and allocated to the nodes of a multi-node system.

FIG. 4 shows an example in which a resource region is partitioned and allocated to the nodes of a multi-node system.

Referring to FIG. 4, a BS, that is, a center node, uses a fixed resource region as in an existing CAS system. For example, the BS can partition a controlling cell into three sectors: a sector #1, a sector #2, and a sector #3. In this case, frequency resources 1 F1 can be used in the sector #1, frequency resources 2 F2 can be used in the sector #2, and frequency resources 3 F3 can be used in the sector #3. The frequency resources 1, 2, and 3 can be resources obtained by dividing one carrier in a frequency domain. Or, if a plurality of carriers is used, the frequency resources 1, 2, and 3 can correspond to respective carriers.

The BS can allocate the resource regions, partitioned according to an FDM method, to nodes within a multi-node system. For example, the BS can allocate the frequency resources 2 F2 to a node #1 22 located within the sector #1 in which the frequency resources 1 F1 are used and allocate the frequency resources 3 F3 to a node #2 23.

As described above, all frequency resources are allocated to a center node (i.e., a BS) as in an existing method, and a resource region is partitioned and allocated to nodes that operate in a DAS. Here, the occurrence of interference can be reduced by allocating different frequency resources to nodes which can generate interference therebetween.

Furthermore, frequency resources allocated to each node can be changed over time. For example, if the BS uses the frequency resources 1 F1 in the sector #1 and then uses the frequency resources 2 F2 in the sector #1, frequency resources allocated to the node #1 22 and the node #2 23 can be changed into the frequency resources 1 F1 and the frequency resources 3 F3.

Figure 5:
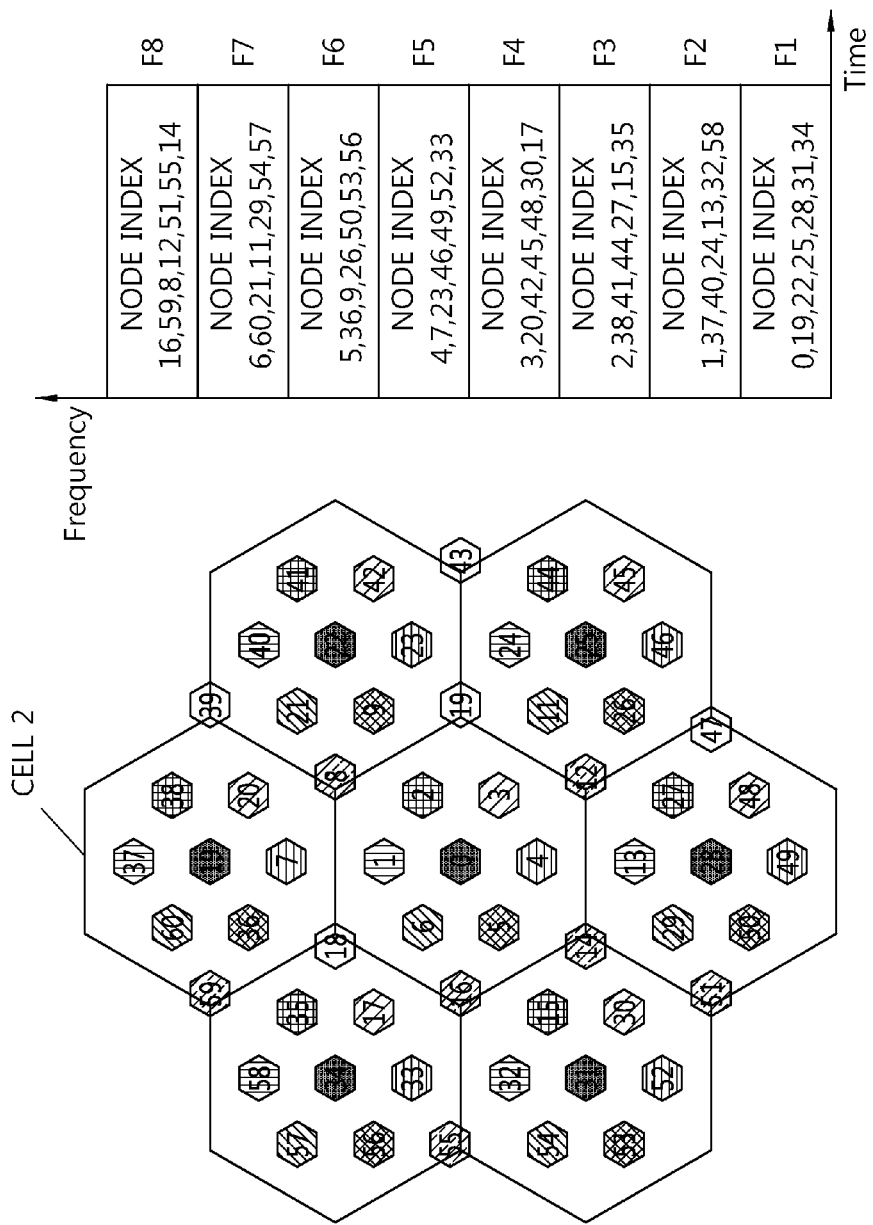
FIG. 5 shows another example in which a resource region is partitioned and allocated to the nodes of a multi-node system.

FIG. 5 shows another example in which a resource region is partitioned and allocated to the nodes of a multi-node system.

Referring to FIG. 5, the multi-node system can include a plurality of cells. Each cell can include a plurality of nodes, for example, 8 nodes. The frequency resources that can be used in each cell can be partitioned in the same manner as the number of nodes within a cell or the number of node groups. That is, in the above example, each cell can use 8 partitioned frequency resources. The 8 partitioned frequency resources are referred to as F1, F2, . . . , F8, for convenience sake.

In this case, a cell 2 includes 8 nodes indexed by 7, 19, 20, 36, 37, 38, 59, and 60. Here, different frequency resources can be assigned to the 8 nodes, for example, F5 for the node #7, F1 for the node #19, F4 for the node #20, F6 for the node #36, F2 for the node #37, F3 for the node #38, F8 for the node #59, and F7 for the node #60. Accordingly, different frequency resources are assigned to nodes within the same cell, and thus interference between the nodes can be reduced.

Figure 6:
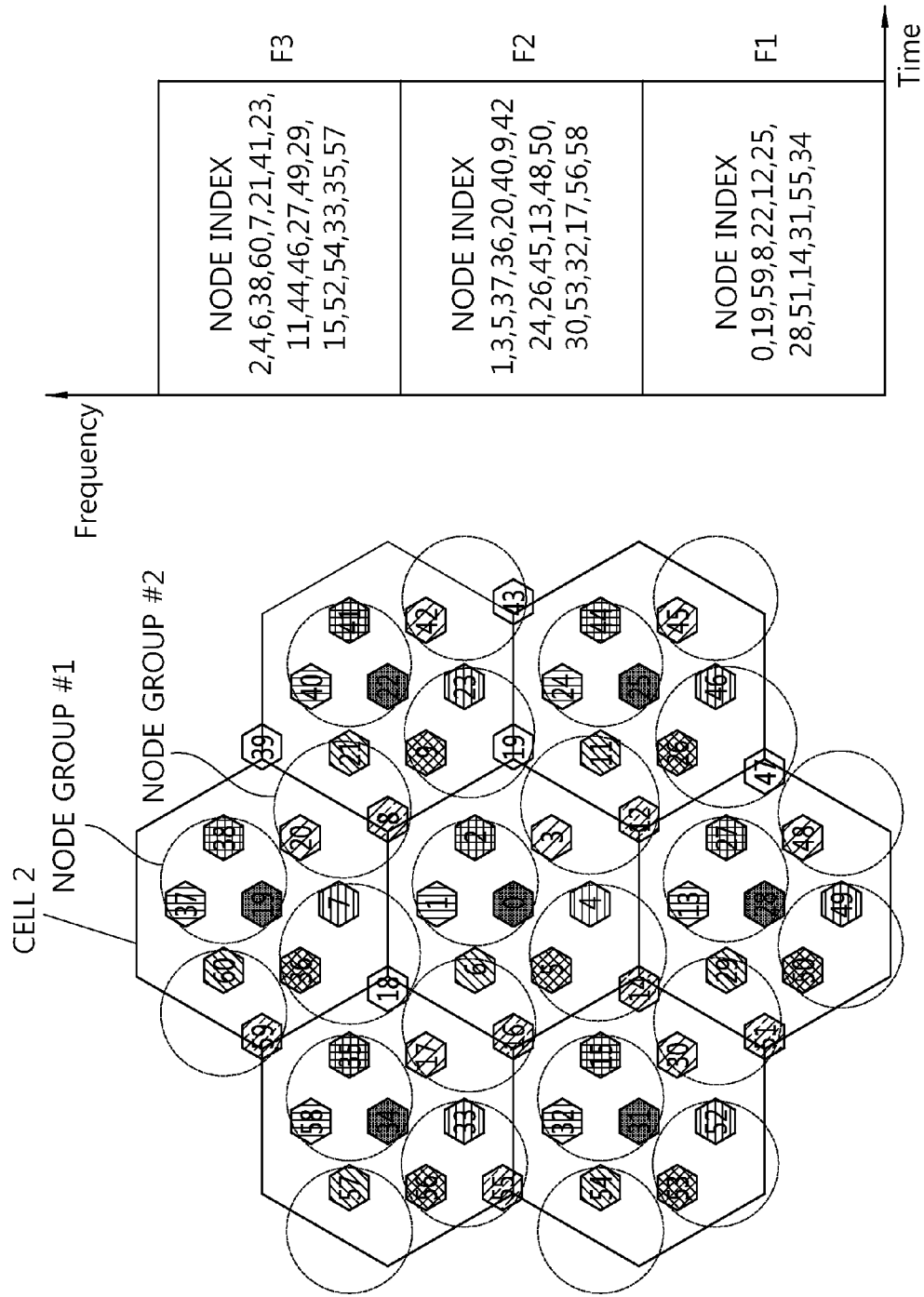
FIG. 6 shows yet another example in which a resource region is partitioned and allocated to the nodes of a multi-node system.

FIG. 6 shows yet another example in which a resource region is partitioned and allocated to the nodes of a multi-node system.

Referring to FIG. 6, the multi-node system can include a plurality of cells. Each of the cells can include a plurality of nodes, for example, 8 nodes. Here, the nodes can be grouped into node groups. For example, the nodes #19, 37, and 38 can be included a node group #1, and the nodes #20, 21, and 8 can be included a node group #2.

Here, the same frequency resources are allocated to each node group, but different frequency resources can be cyclically allocated to the nodes within each node group. That is, frequency resources can be partitioned by the number of nodes within a node group and the partitioned frequency resources are allocated to each node group, but the nodes within the node group use different frequency resources. For example, frequency resources F1, F2, and F3 are allocated to the node group #1 and the node group #2, but frequency resources F2 can be allocated to the nodes #37 and #20, F3 can be allocated to the nodes #38 and #21, and F1 can be allocated to the nodes #19 and #8.

Nodes included in a node group do not need to be included in the same cell. For example, the node group #2 may include the nodes #20, 8, and 21, whereas the nodes #8 and 21 may not be included in a cell 2.

2. Embodiment 2

This method is a method of sharing a resource region between the nodes of a multi-node system, but of using different permutations between the nodes. Here, the permutation means a method of disposing frequency resources allocated to send and receive signals to and from a terminal. The meaning that a permutation is differently used means that at least one of parameters used for a permutation can be differently allocated to each node. The parameters used for the permutation can include, for example, a node ID, a reference signal index, etc.

For example, in IEEE. 802. 16m, processes, such as sub-band partitioning, a miniband permutation, frequency partitioning, the allocation of a CRU/DRU, a subcarrier permutation, the generation of a random sequence, the generation of an MLRU, and logical resource unit mapping, are used in all transmission antennas in common. In contrast, in the present invention, at least one of the above-described processes is differently set for each node. For example, a different permutation can be used for each node by determining a miniband permutation using an ID or index of the node as a parameter. A BS can unicast a parameter for determining a permutation method to each terminal.

Furthermore, in IEEE. 802.16m, a BS broadcasts a power boosting level of each Frequency Partition (FP). In the present invention, this value can be different for each node. The power boosting level for this FP can be unicasted.

3. Embodiment 3

This method is a method of differently allocating uplink and downlink resources to each node of a multi-node system.

Figure 7:
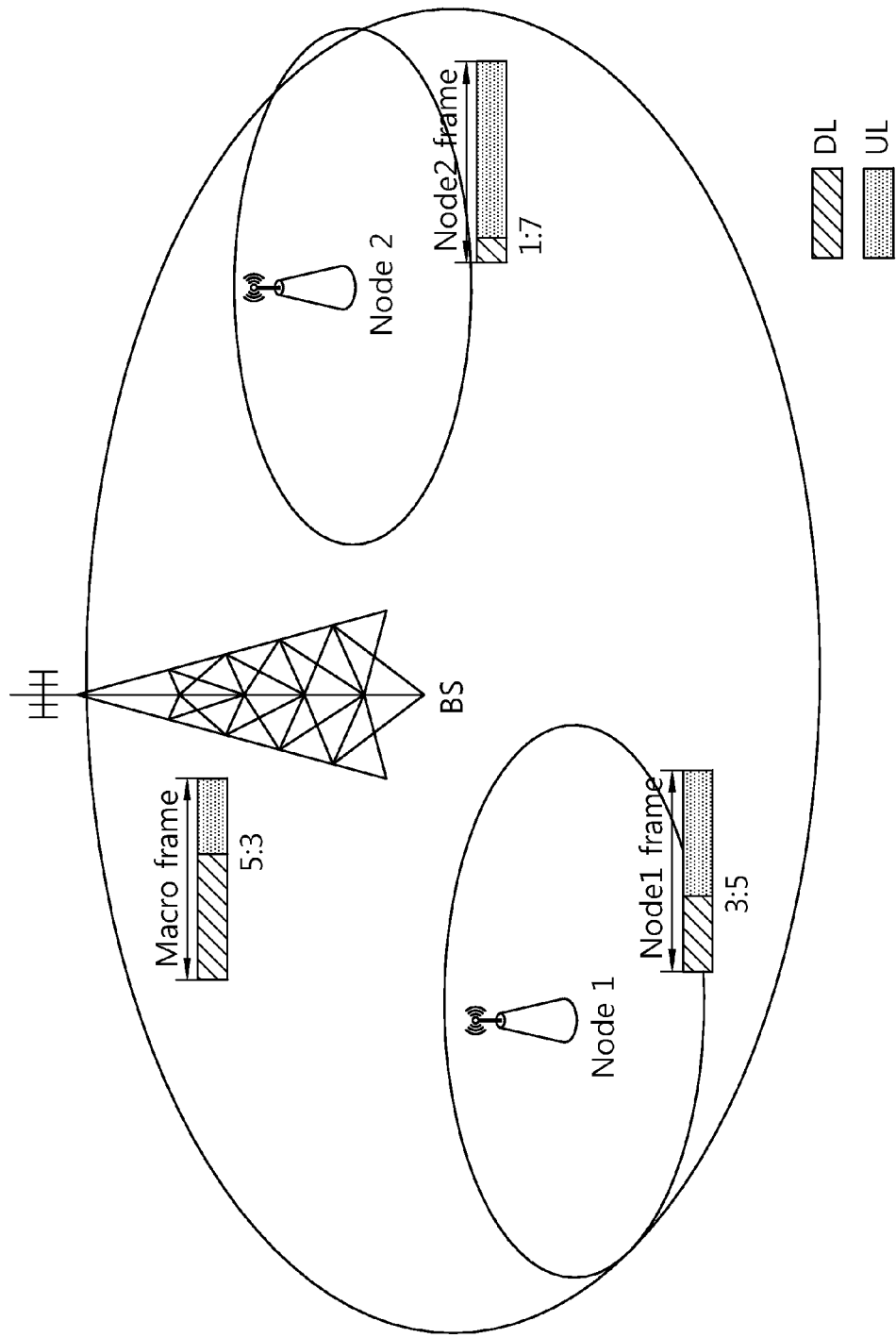
FIG. 7 shows an example in which uplink and downlink resources are differently allocated to nodes in Time Division Duplex (TDD).

FIG. 7 shows an example in which uplink and downlink resources are differently allocated to nodes in Time Division Duplex (TDD).

Referring to FIG. 7, a ratio of downlink subframes (DL SFs) and uplink subframes (UL SFs) can be differently set within one frame in each node of the multi-node system. For example, a value of DL SFs: UL SFs can be 5:3 for a B, a value of DL SFs: UL SFs can be 3:5 for a node 1, and a value of DL SFs: UL SFs can be 1:7 for a node 2.

The BS may differently configure a ratio of DL SFs: UL SFs for each node only during some frame periods.

Furthermore, if multiple carriers are used in TDD, the configuration of each carrier can be different in each node. For example, secondary carriers can be configured using only UL in a node 1, and secondary carriers can be configured using only DL in a node 2. Or, secondary carriers can be configured using DL and DL in both the node 1 and the node 2, but a ratio of DL SFs: DL SFs may be differently set.

If multiple carriers are used in Frequency Division Duplex (FDD), a BS may allocate carriers having different configurations to each node.

Figure 8:
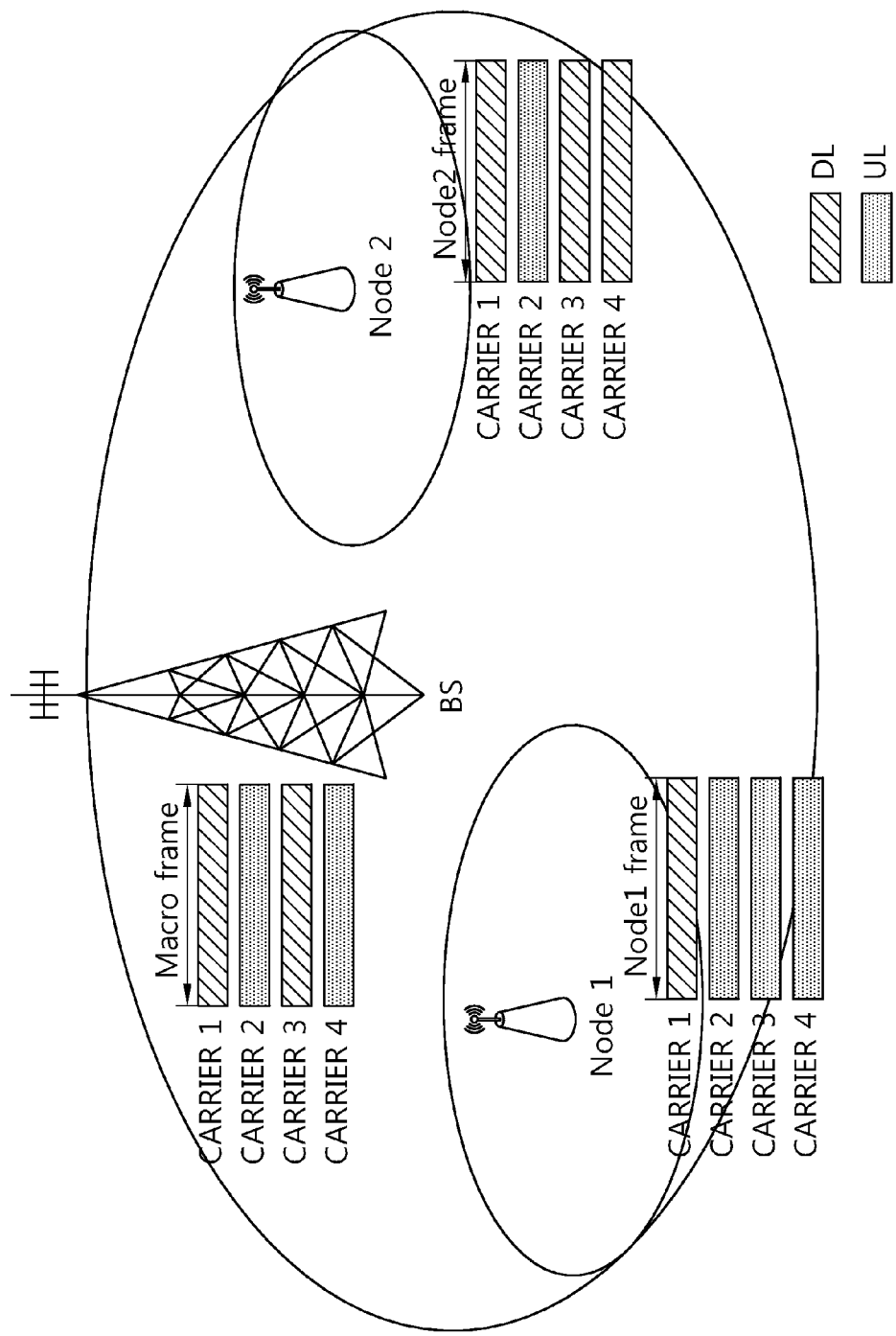
FIG. 8 shows an example in which a different carrier configuration is allocated to each node in FDD.

FIG. 8 shows an example in which a different carrier configuration is allocated to each node in FDD.

Referring to FIG. 8, a BS uses carriers 1 and 3 as downlink carriers and uses carriers 2 and 4 as uplink carriers. The BS can allocate the carriers 1, 2, 3, and 4 so that the carrier 1 is used as a downlink carrier and the carriers 2, 3, and 4 are used as uplink carriers for a node 1. Furthermore, the BS can allocate the carriers 1, 2, 3, and 4 so that the carriers 1, 3, and 4 are used as downlink carriers and the carrier 2 is used as an uplink carrier for the node 2. That is, the same carrier can be differently set as an uplink carrier or a downlink carrier in each node of a multi-node system. Furthermore, the frequency bands of respective carriers can be configured identically or differently.

Furthermore, the embodiment 3 can be used in combination with the embodiments 1 and 2. For example, the frequency resources 1 F1 allocated to the node #1 can become a carrier 1, and the frequency resources 2 F2 allocated to the node #2 can become a carrier 2. Here, a permutation method applied to the carrier 1 and a permutation method applied to the carrier 2 can be differently configured.

The above-described embodiments 1 and 2 are suitable for reducing interference between nodes and improving system efficiency. The embodiment 3 can improve system efficiency by increasing the flexibility of each node.

Figure 9:
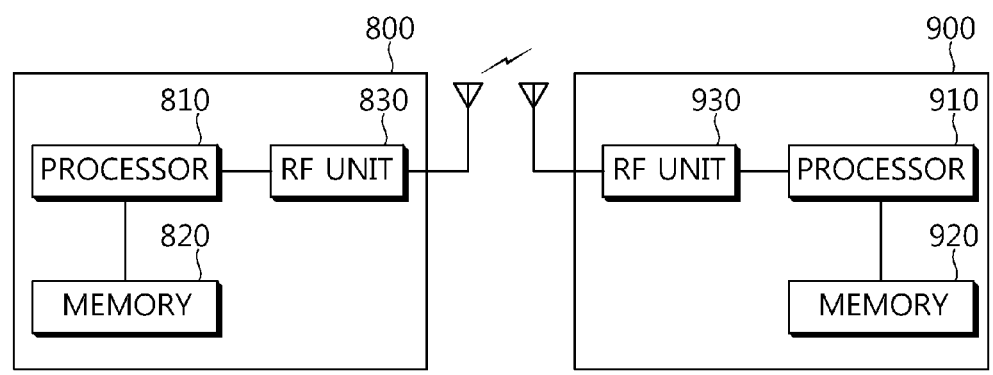
FIG. 9 is a block diagram of an eNB and a terminal in which the embodiments of the present invention are implemented.

FIG. 9 is a block diagram of a BS and a terminal in which the embodiments of the present invention are implemented.

The BS 800 includes a processor 810, a memory 820, and a Radio Frequency (RF) unit 830. The BS 800 can control a plurality of nodes in a multi-node system. The processor 810 implements the proposed functions, processes and/or methods. The layers of a radio interface protocol can be implemented by the processor 810. The processor 810 partitions radio resources available for the BS 800 and allocates the partitioned radio resources to a plurality of nodes. Here, the radio resources allocated to the plurality of nodes have different frequency bands or frame structures between nodes that can generate interference therebetween. A method of allocating the resources has been described with reference to FIGS. 4 to 8. The memory 820 is connected to the processor 810, and the memory 820 stores various pieces of information for driving the processor 810. The RF unit 830 is connected to the processor 810, and the RF unit 830 sends and/or receives radio signals.

The terminal 900 includes a processor 910, a memory 920, and an RF unit 930. The RF unit 930 is connected to the processor 910, and the RF unit 930 sends and/or receives radio signals. The processor 910 implements the proposed functions, processes and/or methods. That is, the processor 910 can receive information about node resource allocation from the BS and know radio resources allocated to each node. The processor 910 can perform communication with the BS through at least one node within a multi-node system. The layers of a radio interface protocol can be implemented by the processor 910. The memory 920 is connected to the processor 910, and the memory 920 stores various pieces of information for driving the processor 910.

The processor 810, 910 can include Application-Specific Integrated Circuits (ASICs), other chipsets, logic circuits and/or data processors. The memory 820, 920 can include Read-Only Memory (ROM), Random Access Memory (RAM), flash memory, memory cards, storage media and/or other storage devices. The RF unit 830, 930 can include a baseband circuit for processing radio signals. When the above-described embodiment is implemented in software, the above-described scheme can be implemented into a module (process or function) that performs the above function. The module can be stored in the memory 820, 920 and executed by the processor 810, 910. The memory 820, 920 can be placed inside or outside the processor 810, 910 and can be coupled with the processor 810, 910 using a variety of well-known means. In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for representing the various aspects may not be described, those skilled in the art will appreciate that other combinations are possible. Accordingly, the present invention should be construed as including all other replacements, modifications, and changes which fall within the scope of the claims.

The invention claimed is:

1. A method of allocating resources in a multi-node system comprising a plurality of nodes and a Base Station (BS) connected to the plurality of nodes, the method comprising:
   partitioning available radio resources for the BS, and
   allocating the partitioned radio resources to the plurality of nodes,
   wherein the partitioned radio resources are allocated to the plurality of nodes using a permutation between the plurality of nodes,
   wherein at least one of parameters used for the permutation is differently allocated to each node of the plurality of nodes,
   wherein the at least one parameters includes or a reference signal index,
   wherein a different permutation is used for each node of the plurality of nodes by determining a miniband permutation of IEEE 802.16m using the reference signal index included in the at least one parameters,
   wherein a power boosting level value of each partitioned radio resources in the IEEE 802.16m is broadcasted to terminals,
   wherein the power boosting level value is different for each node of the plurality of nodes, and
   wherein if the BS and the plurality of nodes support a multi-carrier operation, carriers allocated as downlink carriers and carriers allocated as uplink carriers, from among a plurality of carriers allocated to the plurality of nodes, are differently allocated.

2. The method of claim 1, wherein:
   if the plurality of nodes is N in number, the available radio resources for the BS are partitioned into N frequency bands in a frequency domain, and
   each one of the partitioned N frequency bands is allocated to each of the plurality of nodes,
   wherein N is a natural number equal to or greater than 2.

3. The method of claim 1, wherein:
   if the plurality of nodes is N in number and the N nodes are partitioned into node groups formed of M nodes, the available radio resources for the BS are partitioned into M frequency bands in a frequency domain, and
   any one of the partitioned M frequency bands is allocated to M nodes included in an identical node group,
   wherein each of N and M is a natural number equal to or greater than 2, and N is greater than M.

4. The method of claim 1, wherein:
   the BS transmits node resource allocation information to the terminals, wherein the node resource allocation information comprises information indicative of radio resources allocated to each of the plurality of nodes.

5. The method of claim 1, wherein if the BS and the plurality of nodes operate in Time Division Duplex (TDD), a ratio of downlink subframes and uplink subframes is differently set in a frame used by each of the plurality of nodes.

6. An apparatus for allocating resources in a multi-node system comprising the apparatus connected to a plurality of nodes, the apparatus comprising:
a Radio Frequency (RF) unit transmitting and receiving radio signals; and
a processor connected to the RF unit and generating the radio signals,
wherein the processor partitions available radio resources and allocates the partitioned radio resources to the plurality of nodes,
wherein the partitioned radio resources are allocated to the plurality of nodes using a permutation between the plurality of nodes,
wherein at least one of parameters used for the permutation is differently allocated to each node of the plurality of nodes,
wherein the at least one parameters includes a reference signal index,
wherein a different permutation is used for each node of the plurality of nodes by determining a miniband permutation of IEEE 802.16m using the reference signal index included in the at least one parameters,
wherein a power boosting level value of each partitioned radio resources in the IEEE 802.16m is broadcasted to terminals,
wherein the power boosting level value is different for each node of the plurality of nodes, and
wherein if the apparatus and the plurality of nodes support a multi-carrier operation, the processor differently allocates carriers allocated as downlink carriers and carriers allocated as uplink carriers, from among a plurality of carriers allocated to the plurality of nodes.

7. The apparatus of claim 6, wherein if the plurality of nodes is N in number, the processor partitions the available radio resources into N frequency bands in a frequency domain and allocates each one of the partitioned N frequency bands to each of the plurality of nodes, wherein N is a natural number equal to or greater than 2.

8. The apparatus of claim 6, wherein if the plurality of nodes is N in number and the N nodes are partitioned into node groups formed of M nodes, the processor partitions the available radio resources into M frequency bands in a frequency domain and allocates any one of the partitioned M frequency bands to M nodes included in an identical node group, wherein each of N and M is a natural number equal to or greater than 2, and N is greater than M.

9. The apparatus of claim 6, wherein:
the processor transmits node resource allocation information to the terminals, wherein the node resource allocation information comprises information indicative of radio resources allocated to each of the plurality of nodes.

10. The apparatus of claim 6, wherein, if the apparatus and the plurality of nodes operate in Time Division Duplex (TDD), the processor differently allocates a ratio of downlink subframes and uplink subframes in a frame allocated to each of the plurality of nodes.

* * * * *